United States Patent
Ye

(10) Patent No.: US 9,507,672 B2
(45) Date of Patent: Nov. 29, 2016

(54) METHOD, APPARATUS, AND SYSTEM FOR GENERATING AND RECOVERING MEMORY SNAPSHOT OF VIRTUAL MACHINE

(71) Applicant: Huawei Technologies Co., Ltd., Shenzhen (CN)

(72) Inventor: Chuan Ye, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 247 days.

(21) Appl. No.: 14/251,785

(22) Filed: Apr. 14, 2014

(65) Prior Publication Data
US 2014/0223126 A1 Aug. 7, 2014

Related U.S. Application Data

(63) Continuation of application No. PCT/CN2012/072887, filed on Mar. 23, 2012.

(30) Foreign Application Priority Data

Oct. 12, 2011 (CN) .......................... 2011 1 0307790

(51) Int. Cl.
G06F 11/14 (2006.01)
G06F 9/46 (2006.01)
G06F 9/455 (2006.01)

(52) U.S. Cl.
CPC ....... *G06F 11/1469* (2013.01); *G06F 9/45533* (2013.01); *G06F 9/461* (2013.01);
(Continued)

(58) Field of Classification Search
CPC .. G06F 9/461; G06F 9/5016; G06F 9/45533; G06F 11/1469; G06F 12/1009; G06F 2009/45583; G06F 2212/151
See application file for complete search history.

(56) References Cited

U.S. PATENT DOCUMENTS

| | | | |
|---|---|---|---|
| 6,789,156 B1 * | 9/2004 | Waldspurger | G06F 12/1018 711/202 |
| 2006/0069885 A1 | 3/2006 | Matsui et al. | |

(Continued)

FOREIGN PATENT DOCUMENTS

| | | |
|---|---|---|
| CN | 1755673 A | 4/2006 |
| CN | 1955939 A | 5/2007 |

(Continued)

OTHER PUBLICATIONS

Liu, H., et al., "Optimize Performance of Virtual Machine Checkpointing via Memory Exclusion," 2009 Fourth ChinaGrid Annual Conference, XP031564198, Aug. 21, 2009, pp. 199-204.

(Continued)

*Primary Examiner* — Gary W Cygiel
(74) *Attorney, Agent, or Firm* — Conley Rose, P.C.

(57) ABSTRACT

A method for generating and recovering a memory snapshot of a virtual machine is provided. The method includes: obtaining a current $S^{th}$ memory page of the virtual machine; identifying a page type of the current $S^{th}$ memory page, where the page type includes an invalid data page and a valid data page; and recording the page type of the current $S^{th}$ memory page in a memory snapshot file when the page is an invalid data page; and recording the page type and page data of the current $S^{th}$ memory page in the memory snapshot file when the page is a valid data page, so that only valid data is stored according to the embodiments of the present invention, thereby reducing backup of invalid data, greatly shortening the generation time of the memory snapshot, reducing the size of the memory snapshot file, and saving storage resources.

4 Claims, 10 Drawing Sheets

(52) U.S. Cl.
CPC . *G06F11/1438* (2013.01); *G06F 2009/45583* (2013.01); *G06F 2201/815* (2013.01); *G06F 2201/84* (2013.01)

(56) References Cited

U.S. PATENT DOCUMENTS

| 2008/0022032 A1 | 1/2008 | Nicholas et al. |
| 2010/0070678 A1 | 3/2010 | Zhang et al. |

FOREIGN PATENT DOCUMENTS

| CN | 101063951 A | 10/2007 |
| CN | 101436207 A | 5/2009 |
| CN | 102193843 A | 9/2011 |
| CN | 102331949 A | 1/2012 |

OTHER PUBLICATIONS

Hines, H., et al., "Post-Copy Based Live Virtual Machine Migration Using Adaptive Pre-Paging and Dynamic Self-Ballooning," XP007911483, VEE'09: Proceedings of the 2009 ACM Sigplan/Sigop International Conference on Virtual Execution Environments; Mar. 11-13, 2009, pp. 51-60.

Park, E., et al., "Fast and Space-Efficient Virtual Machine Checkpointing," Virtual Execution Environments, ACM, Mar. 9, 2011, pp. 75-85.

Partial English Translation and Abstract of Chinese Patent Application No. CN102193843, May 4, 2014, 13 pages.

Foreign Communication From a Counterpart Application, Chinese Application No. 201110307790.4, Chinese Search Report dated Jun. 5, 2013, 2 pages.

Foreign Communication From a Counterpart Application, Chinese Application No. 201110307790.4, Chinese Office Action dated Jun. 19, 2013, 7 pages.

Foreign Communication From a Counterpart Application, European Application No. 12779387.5, Extended European Search Report dated Jul. 3, 2014, 9 pages.

Foreign Communication From a Counterpart Application, PCT Application No. PCT/CN2012/072887, English Translation of International Search Report dated Jul. 26, 2012, 3 pages.

Foreign Communication From a Counterpart Application, PCT Application No. PCT/CN2012/072887, English Translation of Written Opinion dated Jul. 26, 2012, 8 pages.

\* cited by examiner

Determine a page type of a current $S^{th}$ memory page according to page type information stored in VMM memory space, where the page type includes a balloon page, a pod page, a share page, a swap page, and a common page ⸺ S201

When the page type of the current $S^{th}$ memory page is a common page, traverse content of the current $S^{th}$ memory page, and identify the page type of the current $S^{th}$ memory page as a zero page or a non-zero page, where the balloon page, the pod page, and the zero page are invalid data pages, and the non-zero page, the share page, and the swap page are valid data pages ⸺ S202

FIG. 2

METHOD, APPARATUS, AND SYSTEM FOR GENERATING AND RECOVERING MEMORY SNAPSHOT OF VIRTUAL MACHINE

CROSS-REFERENCE TO RELATED APPLICATIONS

This application is a continuation of International Application No. PCT/CN2012/072887, filed on Mar. 23, 2012, which claims priority to Chinese Patent Application No. 201110307790.4, filed on Oct. 12, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to a memory snapshot technology, and in particular, to a method, an apparatus, and a system for generating and recovering a memory snapshot of a virtual machine.

BACKGROUND

A user can simulate one or more virtual machines on one physical computer by using a virtualization technology, and these virtual machines can work like real computers, for example, the user may install an operating system, install an application, access network resources, and so on.

A snapshot technology of a virtual machine is generated at the same time as the virtualization technology, and because computing and storage resources of a virtual machine are virtualized by a virtual machine monitor (VMM), we can reserve a central processing unit (CPU) state, a memory state, and storage data of the virtual machine at a certain time point conveniently by using the snapshot technology, so that complicated backup of all states can be easily implemented on a physical machine, and a user can conveniently back up and recover the virtual machine.

At present, there are mainly two kinds of common snapshot applications: one is simple storage snapshot, where only storage data is backed up; when a virtual machine user uses a virtual machine, a mirror of the virtual machine may be damaged or the virtual machine may fail to be activated normally for various reasons (such as viruses, damage by Trojan, mistaken deletion of a system file, or mistaken formatting), and if related data is backed up by means of the storage snapshot when the virtual machine is normal, page data of a backup point can be conveniently recovered. The other is a combination of storage snapshot and memory snapshot; in some scenarios, a user needs to quickly create or recover a virtual machine (deployment and loading of a related service is complicated and cumbersome, interruption time for service recovery is highly required, and virtual machines are rapidly deployed in batches, and so on), or a current service state needs to be reserved for some debugging requirements (fault locating, test branch selection, and so on), and at this time, using a storage snapshot alone cannot meet the requirements. Therefore, introduction of a memory snapshot compensates for the deficiency in this aspect, and memory data of the virtual machine is stored into a memory snapshot file on an external storage medium by means of a capability of a VMM, thereby facilitating storage and recovery at any time; and in addition, this is also a convenience brought about under a virtualization condition.

Virtual Machine ware (VMWare) is a leading vendor of a virtualization solution, and currently can provide an overall solution for a snapshot of a virtual machine, including a storage snapshot and a memory snapshot. The memory snapshot thereof is full copying of a black box of the memory data, and the size of a generated snapshot file is consistent with a memory specification of a virtual machine, that is, the size of a memory snapshot file finally generated by a virtual machine with 1 gigabyte (G) memory is 1G, and is stored in a distributed storage thereof together with the storage snapshot. When a snapshot is recovered, snapshot files are read in sequence to perform 1:1 memory recovery. Therefore, both a snapshot generation process and a snapshot recovery process take a long time, and in addition, the size of the generated memory snapshot file is consistent with that of the memory of the virtual machine, which also is a waste of storage resources.

SUMMARY

Embodiments of the present invention provide a method, an apparatus, and a system for generating and recovering a memory snapshot of a virtual machine, so as to shorten the processing time of the memory snapshot of the virtual machine and save storage resources.

The embodiments of the present invention provide the following technical solutions:

According to one aspect, an embodiment of the present invention provides a method for generating a memory snapshot of a virtual machine, including: obtaining a current $S^{th}$ memory page of the virtual machine; identifying a page type of the current $S^{th}$ memory page, where the page type includes an invalid data page and a valid data page; and recording the page type of the current $S^{th}$ memory page in a memory snapshot file when the current $S^{th}$ memory page is an invalid data page; and recording the page type and page data of the current $S^{th}$ memory page in the memory snapshot file when the current $S^{th}$ memory page is a valid data page.

According to another aspect, an embodiment of the present invention provides a method for recovering a memory snapshot of a virtual machine, including: obtaining and parsing a memory snapshot file of the virtual machine; and when a page type of a current $S^{th}$ memory page that is recorded in the memory snapshot file is an invalid data page, recording the page type of the current $S^{th}$ memory page as an invalid data page in VMM memory space; and when the page type of the current $S^{th}$ memory page that is recorded in the memory snapshot file is a valid data page, recording the page type of the current $S^{th}$ memory page as a valid data page in the VMM memory space, and correspondingly copying page data of the current $S^{th}$ memory page that is recorded in the memory snapshot file into an $S^{th}$ memory page of the virtual machine.

According to another aspect, an embodiment of the present invention provides a physical host, where the physical host includes: a hardware layer, a VMM running at the hardware layer, and a virtual machine running on the VMM, where the VMM includes a memory snapshot generation module and a memory page identification module, where the memory snapshot generation module is configured to obtain a current $S^{th}$ memory page of the virtual machine; when the memory page identification module identifies that the current $S^{th}$ memory page is an invalid data page, record a page type of the current $S^{th}$ memory page in a memory snapshot file; and when the memory page identification module identifies that the current $S^{th}$ memory page is a valid data page, record the page type and page data of the current $S^{th}$ memory page in the memory snapshot file; the memory page identification module is configured to identify the page type of the current $S^{th}$ memory page obtained by the memory snapshot generation module, where the page type includes an invalid data page and a valid data page; and the hardware layer includes a storage device, and the storage device is configured to store the memory snapshot file.

According to another aspect, an embodiment of the present invention provides a computer system, where the system includes a physical host and a network storage device, where the physical host is the physical host provided by the embodiment of the present invention, and is configured to generate and recover a memory snapshot file of a virtual machine; and the network storage device is configured to store a memory snapshot file of a virtual machine of the physical host.

It can be seen that, in the method, the apparatus, and the system for generating and recovering a memory snapshot of a virtual machine that are provided by the embodiments of the present invention, different memory page types are identified, and different snapshot generation processing is performed according to the different memory page types in a memory snapshot generation process, including: when a current $S^{th}$ memory page is an invalid data page, only recording a page type of the current $S^{th}$ memory page in a memory snapshot file; and when the current $S^{th}$ memory page is a valid data page, recording the page type and page data of the current $S^{th}$ memory page in the memory snapshot file; and different snapshot recovery processing is performed according to the different memory page types in a memory snapshot recovery process, including: when the page type of the current $S^{th}$ memory page that is recorded in the memory snapshot file is an invalid data page, recording the page type of the current $S^{th}$ memory page as an invalid data page in VMM memory space; and when the page type of the current $S^{th}$ memory page that is recorded in the memory snapshot file is a valid data page, recording the page type of the current $S^{th}$ memory page as a valid data page in the VMM memory space, and correspondingly copying the page data of the current $S^{th}$ memory page that is recorded in the memory snapshot file into an $S^{th}$ memory page of the virtual machine, so that only valid data is stored according to the embodiments of the present invention, thereby reducing backup and recovery of invalid data, greatly shortening the generation and recovery time of the memory snapshot, and reducing storage resources occupied by the memory snapshot.

BRIEF DESCRIPTION OF THE DRAWINGS

To describe the technical solutions in the embodiments of the present invention more clearly, the following briefly introduces accompanying drawings required for describing the embodiments. The accompanying drawings in the following description show merely some embodiments of the present invention, and a person of ordinary skill in the art may still derive other drawings from these accompanying drawings without creative efforts.

FIG. 2 is a schematic flowchart of another method for generating a memory snapshot of a virtual machine according to an embodiment of the present invention;

DETAILED DESCRIPTION

The following clearly describes the technical solutions in the embodiments of the present invention with reference to the accompanying drawings in the embodiments of the present invention. The described embodiments are merely a part of the embodiments of the present invention rather than all of the embodiments. All other embodiments obtained by a person of ordinary skill in the art based on the embodiments of the present invention without creative efforts shall fall within the protection scope of the present invention.

Figure 1:
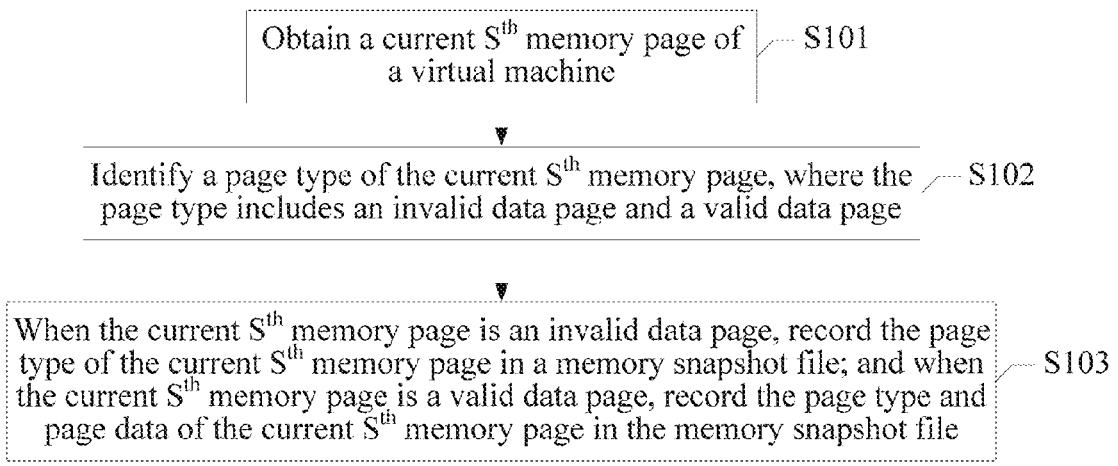
FIG. 1 is a schematic flowchart of a method for generating a memory snapshot of a virtual machine according to an embodiment of the present invention.

Embodiment 1 of the present invention provides a method for generating a memory snapshot of a virtual machine. As shown in FIG. 1, the method may include:

Step S101: Obtain a current $S^{th}$ memory page of the virtual machine.

It should be noted that, in the embodiment of the present invention, the "$S^{th}$ memory page" is introduced only for the convenience of description rather than for limiting a specific memory page, and it should be understood that, herein, S may be 1, 2, ... N (N=an actual page quantity of the virtual machine), and when S is 1, it indicates that the current memory page obtained in this step is a first memory page of the virtual machine.

In this step, memory pages may be obtained in a sequence or memory pages may be obtained in a reverse sequence, which is not limited.

Step S102: Identify a page type of the current $S^{th}$ memory page, where the page type includes an invalid data page and a valid data page.

Step S102 may be: identifying the page type of the current $S^{th}$ memory page at least according to page type information stored in VMM memory space, where the page type includes an invalid data page and a valid data page.

Specifically, in an implementation manner, step S102 specifically is: determining the page type of the current $S^{th}$ memory page according to page type information stored in a VMM memory space, where the page type includes a balloon page (Balloon), a populate-on-demand page (populate on demand, Pod), a share page (share), a swap page (swap), and a common page, where the balloon page and the populate-on-demand page are invalid data pages, and the share page, the swap page, and the common page are valid data pages. In a specific implementation manner, a structure variable of a memory page type is maintained in the VMM memory space, where a common page is a default value, and the type thereof will be changed and marked when pages of other types appear. In an open source virtual machine Xen, a structure variable p2 m_type_t of the memory page of the virtual machine may be obtained from a VMM memory by invoking a system interface, so as to determine the type thereof, where when p2 m_invalid=0, the memory page is a balloon page, when p2 m_populate_on_demand=6, the memory page is a populate-on-demand page, when p2 m_ram_paged=10, the memory page is a swap page, when p2 m_ram_shared=13, the memory page is a share page, and when p2 m_ram_rw=1, the memory page is a common page.

In another implementation manner, referring to FIG. 2, step S102 may include step S201 and step S202.

Step S201: Determine the page type of the current $S^{th}$ memory page according to page type information stored in VMM memory space, where the page type includes a balloon page, a populate-on-demand page, a share page, a swap page, and a common page.

Step S202: When the page type of the current $S^{th}$ memory page is a common page, traverse content of the current $S^{th}$ memory page, and determine that the page type of the current $S^{th}$ memory page is a zero page or a non-zero page, where the balloon page, the populate-on-demand page, and the zero page are invalid data pages, and the non-zero page, the share page, and the swap page are valid data pages.

It should be noted that, the memory page types listed in the embodiment of the present invention are some memory page types that may appear in a current virtual machine, and some are widely applied, such as the balloon page, the zero page, and the non-zero page, and some are rarely applied, such as the share page and the swap page; and currently, universality of a populate-on-demand page is not high; however, it is also applied to an Xen open source virtual machine. The embodiment of the present invention uses these page types as examples, and is not intended to limit identification of these page types. Other memory page types currently applied and a memory page type that may appear later shall fall within the protection scope of the present invention as long as they are applied to the method for generating and recovering a memory snapshot that is disclosed in the embodiment of the present invention.

Step S103: When the current $S^{th}$ memory page is an invalid data page, record the page type of the current $S^{th}$ memory page in a memory snapshot file; and when the current $S^{th}$ memory page is a valid data page, record the page type and page data of the current $S^{th}$ memory page in the memory snapshot file.

Correspondingly, in an implementation manner, a balloon page and a populate-on-demand page are invalid data pages, and a share page, a swap page, and a common page are valid data pages; and step S103 may specifically include: when the current $S^{th}$ memory page is a balloon page, recording the page type of the current $S^{th}$ memory page as a balloon page in the memory snapshot file; when the current $S^{th}$ memory page is a populate-on-demand page, recording the page type of the current $S^{th}$ memory page as a populate-on-demand page in the memory snapshot file; when the current $S^{th}$ memory page is a swap page, recording the page type of the current $S^{th}$ memory page as a swap page in the memory snapshot file, and copying page data of the swap page from a memory swap file into the memory snapshot file; when the current $S^{th}$ memory page is a share page, recording the page type of the current $S^{th}$ memory page as a share page in the memory snapshot file, copying page data of the share page into the memory snapshot file, and recording a page number of another memory page sharing memory data with the current $S^{th}$ memory page; and when the current $S^{th}$ memory page is a common page, recording the page type of the current $S^{th}$ memory page as a common page in the memory snapshot file, and copying page data of the common page into the memory snapshot file.

Correspondingly, in another implementation manner, a balloon page, a populate-on-demand page, and a zero page are invalid data pages, and a non-zero page, a share page, and a swap page are valid data pages; and step S103 may specifically include: when the current $S^{th}$ memory page is a balloon page, recording the page type of the current $S^{th}$ memory page as a balloon page in the memory snapshot file; when the current $S^{th}$ memory page is a populate-on-demand page, recording the page type of the current $S^{th}$ memory page as a populate-on-demand page in the memory snapshot file; when the current $S^{th}$ memory page is a zero page, recording the page type of the current $S^{th}$ memory page as a zero page in the memory snapshot file; when the current $S^{th}$ memory page is a non-zero page, recording the page type of the current $S^{th}$ memory page as a non-zero page in the memory snapshot file, and copying the page data of the current $S^{th}$ memory page into the memory snapshot file; when the current $S^{th}$ memory page is a swap page, recording the page type of the current $S^{th}$ memory page as a swap page in the memory snapshot file, and copying page data of the swap page from a memory swap file into the memory snapshot file; and when the current $S^{th}$ memory page is a share page, recording the page type of the current $S^{th}$ memory page as a share page in the memory snapshot file, copying page data of the share page into the memory snapshot file, and recording a page number of another memory page sharing memory data with the current $S^{th}$ memory page.

To sum up, in the method for generating a memory snapshot of a virtual machine provided by the embodiment of the present invention, different memory page types are identified, and different snapshot generation processing is performed according to the different memory page types in a memory snapshot generation process, including: when a current $S^{th}$ memory page is an invalid data page, only recording a page type of the current $S^{th}$ memory page in a memory snapshot file; and when the current $S^{th}$ memory page is a valid data page, recording the page type and page data of the current $S^{th}$ memory page in the memory snapshot file. Therefore, only valid data is stored in the embodiment of the present invention, thereby reducing backup of invalid data, greatly shortening the generation time of the memory snapshot, reducing the size of the memory snapshot file, and saving storage resources.

Figure 3:
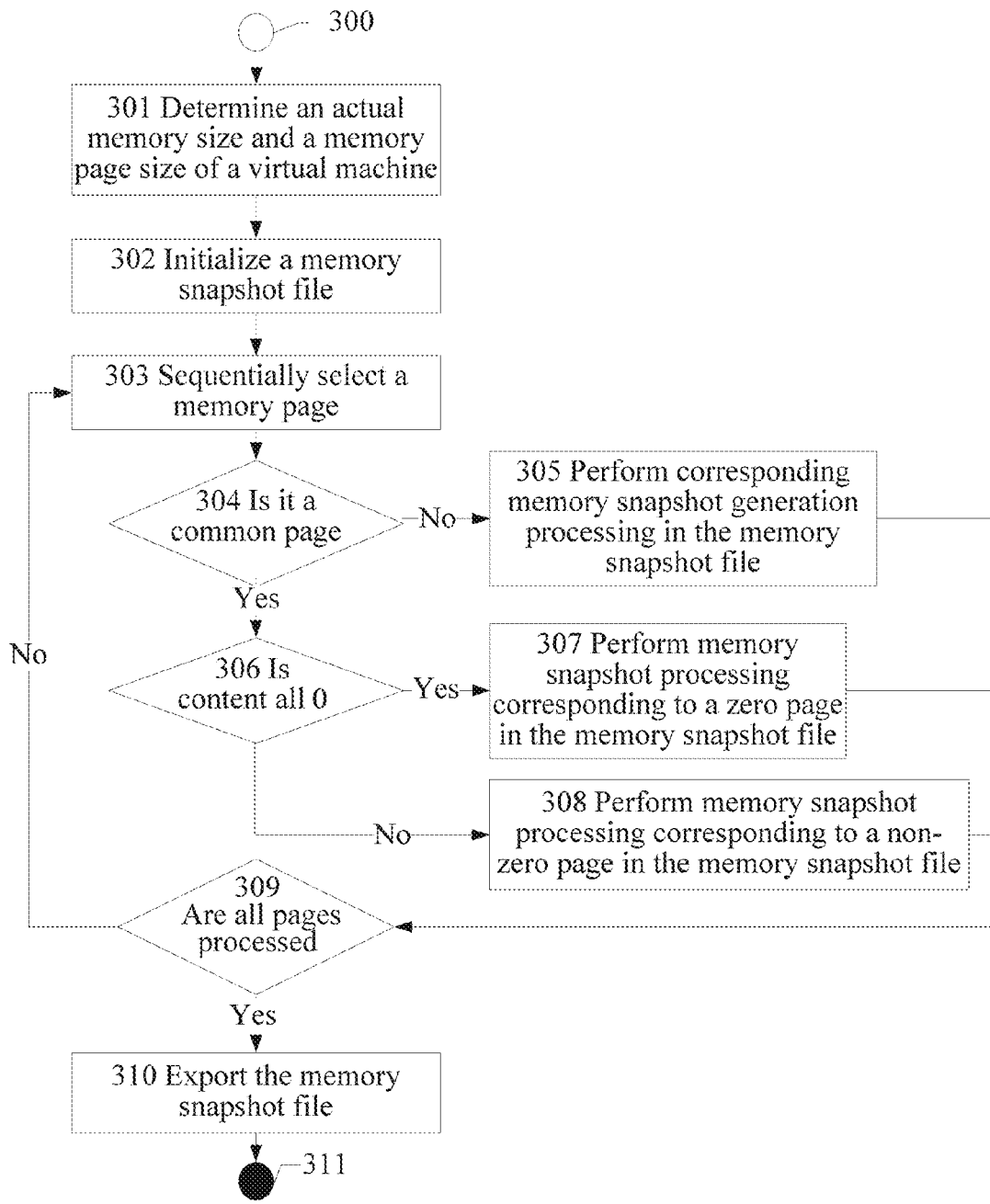
FIG. 3 is a schematic flowchart of still another method for generating a memory snapshot of a virtual machine according to an embodiment of the present invention.

Embodiment 2 of the present invention provides a method for generating a memory snapshot of a virtual machine, and the following describes the procedure of the method for generating a memory snapshot of a virtual machine in detail with reference to FIG. 3, which includes the following steps:

Step 300: The procedure starts.

The start of the procedure may be triggered by a user. A physical host provides a final user with a user interface to trigger the memory snapshot operation. The start of the procedure may also be automatically triggered by the virtual machine, may be periodically triggered, or may also be automatically triggered according to a running state or the like of the virtual machine.

Step 301: Determine information such as an actual memory size and a memory page size (which may also be called a page size, and generally is 4 kilobytes (KB) or 2 megabytes (MB)) of the virtual machine, where these pieces of information are used to initialize a memory snapshot file, and used to determine the integrity of the memory snapshot file when a memory snapshot of the virtual machine is recovered.

It should be noted that, herein, the virtual machine may be a virtual machine specified by a user through a user interface, or may be a periodically triggered virtual machine.

Step 302: Initialize the memory snapshot file, including pre-applying for storage space of the memory snapshot file and initializing the structure and initial information of the memory snapshot file. The initial information refers to information such as the memory size, the memory page size, the number of memory pages (specifically, the actual number of memory pages of the virtual machine can be calculated according to the actual memory size and the memory page size of the virtual machine), and a start address of valid data of the virtual machine.

Figure 4:
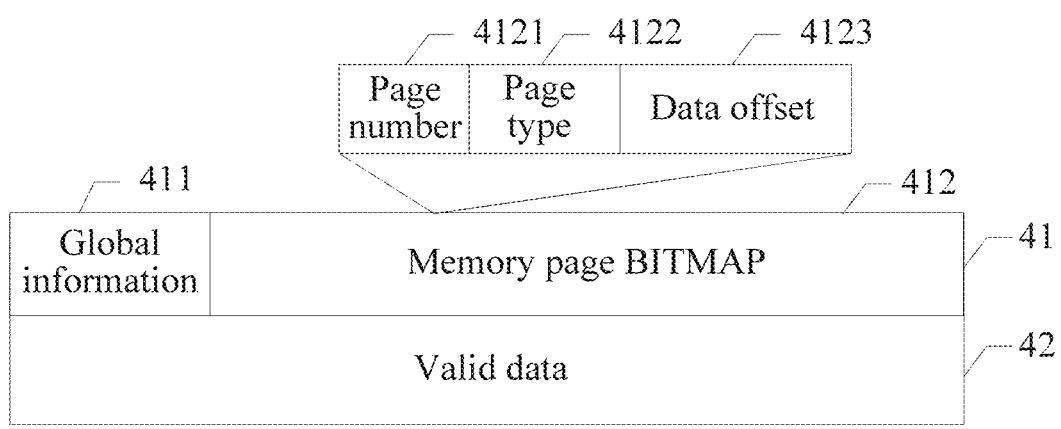
FIG. 4 is a schematic diagram of a logical structure of a memory snapshot file according to an embodiment of the present invention.

Preferably, as shown in FIG. 4, the structure of the memory snapshot file provided in the embodiment of the present invention includes an information segment 41 and a data segment 42, where the information segment 41 includes: global information 411 and a bitmap structure BITMAP of a memory page, where the bitmap structure BITMAP is a universal sequential data storage structure, and in the embodiment of the present invention, a page number 4121, a page type 4122, and a data offset 4123 of the memory page are stored by using the structure. Valid data in a valid data page is sequentially stored in the data segment 42 and has one-to-one correspondence with the data offset 4123 in the information segment 41. The global information 411 may be used for recording global information such as the memory size, the number of memory pages, the memory page size, and the start address of the valid data of the virtual machine, and these pieces of information may be written into a memory snapshot when the memory snapshot file 302 is initialized, or may be written into the memory snapshot after the memory page is processed. The page number 4121 records a page number of each memory page; the page type 4122 records a page type identifier of a memory page corresponding to the page number; and the data offset 4123 records an offset which is of valid data of a memory page corresponding to the data offset 4123 and is in the data segment 42, that is, valid data recorded in the data segment 42 is indexed according to the data offset 4123 in the information segment 41, and corresponding memory data can be found from the data segment 42 by adding the data offset to the start address of the valid data.

It should be noted that, the structure of the memory snapshot file provided in FIG. 4 is not intended to limit the structure to this type only, but is merely an example for description. In another implementation manner, the memory snapshot file may also include two fields: a page type 51 and valid data 52 shown in FIG. 5. The page type 51 stores a type identifier of an identified memory page, where the type identifier uniquely identifies one page type and may be autonomously defined, for example, 000 represents a zero page, and 001 represents a balloon page. The valid data 52 stores page data of a valid data page, where the valid data page includes a non-zero page, a share page, and a swap page.

Figure 5:
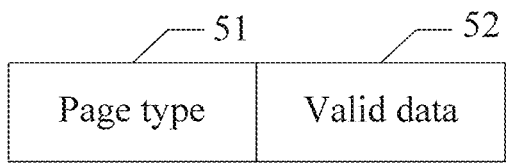
FIG. 5 is a schematic diagram of a logical structure of another memory snapshot file according to an embodiment of the present invention.

It should be noted that, a storage location of a share page number of a share page may be determined according to information stored in each part of the memory snapshot file, a capacity of each part, or another factor, for example, as shown in FIG. 5, some space is reserved in the valid data 52 or the page type 51 to store the share page number, and definitely, a separate part may be divided from the memory snapshot to store the share page number.

It should be noted that, according to the above-mentioned structure of the memory snapshot file, a person skilled in the art can easily figure out other equivalent replacement manners or obvious variation manners. For example, the global information in FIG. 4 is simplified and only the page quantity and the page size are stored; page number information may also not be stored, and so on; or a storage sequence of a memory snapshot is changed, and so on. These equivalent replacement manners or obvious variation manners should also be construed as falling within the protection scope of the present invention.

Step 303: Sequentially select a memory page.

It may be that memory pages are identified one by one starting from a first memory page.

Step 304: Determine, according to memory page type information stored in VMM memory space, whether a current memory page is a common page, when it is determined that the selected memory page is not a common page, perform step 305; and when it is determined that the selected memory page is a common page, perform step 306.

In an implementation manner, the memory page type information is stored in a page type structure, and the page type structure is stored in a memory at a hardware layer of a physical host, and specifically, the page type structure is stored in the VMM memory space and can be obtained when invoked by a system. The VMM memory space is a specific area divided from a physical memory by a VMM to implement normal work and stores related key information such as a data structure, for example, a structure variable of a memory page type of the virtual machine, a memory sharing hash table, and a one-to-one mapping between memory of the virtual machine and the physical memory, where the key information is used when the VMM implements various functions such as virtual device simulation, memory management, and memory snapshot generation and recovery. When multiple virtual machines are managed by the VMM, separate parts are divided from this VMM memory space to store information of different virtual machines. The VMM may access the VMM memory space by invoking a system interface.

Step 305: Perform corresponding memory snapshot generation processing in the memory snapshot file according to a specific page type of the memory page. Herein, the page type includes: a balloon page, a populate-on-demand page, a share page, and a swap page.

Specifically, when the memory page is a balloon page, the page type of the memory page is recorded as a balloon page in the page type 4122 field of the foregoing memory snapshot file (referring to FIG. 4); when the memory page is a populate-on-demand page, the page type of the memory page is recorded as a populate-on-demand page in the page type 4122 field of the foregoing memory snapshot file; when the memory page is a swap page, the page type of the memory page is recorded as a swap page in the page type 4122 field of the foregoing memory snapshot file, valid data of the swap page is copied from a memory swap file into the data segment 42 of the foregoing memory snapshot file, and offsets of these pieces of valid data in the data segment 42 are recorded in the data offset 4123 field; when the memory page is a share page, the page type of the memory page is recorded as a share page in the page type 4122 field of the foregoing memory snapshot file, shared data of the share page is copied into the data segment 42 of the foregoing memory snapshot file, and offsets of these pieces of shared data in the data segment 42 and a page number of another memory page sharing the memory data with the share page are recorded in the data offset 4123 field, where the share page number may be obtained by querying, by invoking the system interface, a memory sharing hash table stored in the VMM memory.

Step 306: Determine, by traversing content of the memory page, whether the content of the memory page is all 0. If yes, the page is a zero page, and go to step 307; and if not, the page is a non-zero page, and go to step 308.

Step 307: Perform, in the memory snapshot file, processing corresponding to a zero page, that is, record a page type of a current $S^{th}$ memory page as a zero page in the page type 4122 of the memory snapshot file and not copy the memory data.

Step 308: Perform, in the memory snapshot file, processing corresponding to a non-zero page, that is, record the page type of the current $S^{th}$ memory page as a non-zero page in the page type 4122 of the memory snapshot file, copy page data of the current $S^{th}$ memory page into the data segment 42 of the memory snapshot file, and record, in the data offset 4123, an offset of the data in the data segment 42.

Step 309: Determine whether all memory pages are processed; and if a determination result in step 309 is yes, perform step 310; and if a determination result in step 309 is no, return to step 303 to select a next memory page to continue the memory snapshot generation procedure.

It may be that, determination in step 309 is performed each time the memory snapshot processing of a memory page is finished, and the determination may be performed by using a page number; and the determination may be performed by marking the memory page as read or processed when information such as a page number is not stored in the memory snapshot file.

Step 310: Export the memory snapshot file, where the exported memory snapshot file may be stored in a hard disk.

Step 311: Stop a memory snapshot generation operation.

Optionally, in the embodiment of the present invention, when the memory page is identified as a share page, memory page numbers of all shared data are recorded, and memory data shared by them is copied into the memory snapshot file, at this time, in order to improve the memory page identification efficiency, memory pages of all the shared data may be marked as read, and these share pages marked as read may be skipped during memory page identification.

To sum up, in the method for generating a memory snapshot of a virtual machine provided by the embodiment of the present invention, a memory snapshot file is initialized, where the memory snapshot file specifically includes an information segment (global information, a page number, a page type, and a data offset) and a data segment; then, a page type of a memory page of the virtual machine is sequentially obtained and identified; and different memory snapshot generation processing is performed in this memory snapshot file for different page types, which specifically includes: when the obtained memory page is identified as a balloon page, recording the page type of the memory page as a balloon page in a page type field of this memory snapshot file; when the obtained memory page is identified as a populate-on-demand page, recording the page type of the memory page as a populate-on-demand page in the page type field of this memory snapshot file; when the obtained memory page is identified as a swap page, recording the page type of the memory page as a swap page in the page type field of this memory snapshot file, copying valid data of the swap page from a memory swap file into the data segment of the memory snapshot file, and recording, in a data offset field, an offset of the data in the data segment; and when the obtained memory page is identified as a share page, recording the page type of the memory page as a share page in the page type field of the memory snapshot file, copying shared data of this share page into the data segment of the memory snapshot file, and recording, in the data offset field, an offset of the data in the data segment and a page number of another memory page sharing memory data with the share page. Therefore, according to the embodiment of the present invention, only valid data is stored, thereby reducing backup of invalid data, greatly shortening the generation time of the memory snapshot, reducing the size of the memory snapshot file, and saving storage resources.

Figure 6:
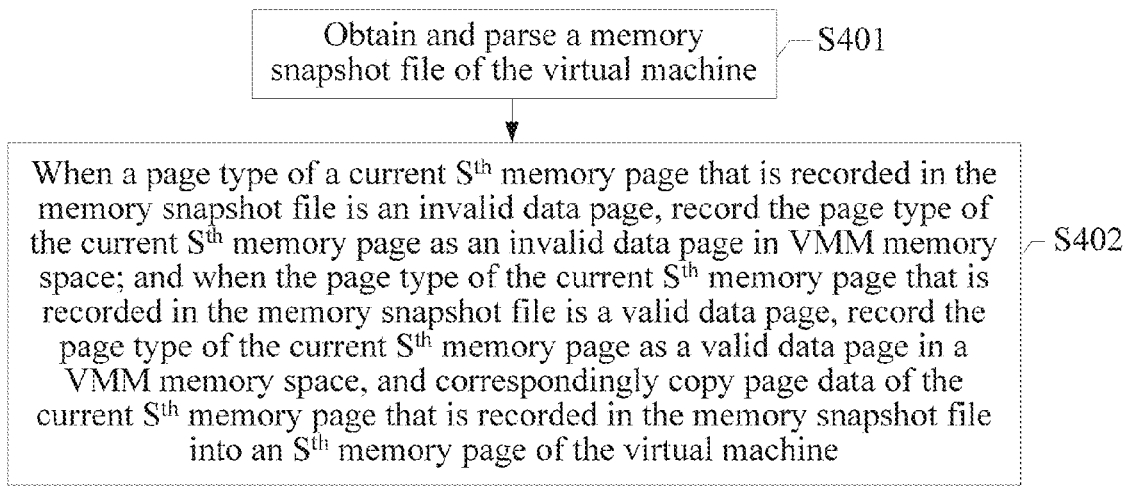
FIG. 6 is a schematic flowchart of a method for recovering a memory snapshot of a virtual machine according to an embodiment of the present invention.

Embodiment 3 of the present invention provides a method for recovering a memory snapshot of a virtual machine. As shown in FIG. 6, the method may include:

Step S401: Obtain and parse a memory snapshot file of the virtual machine.

In an implementation manner, the structure of the memory snapshot file provided in the embodiment of the present invention is shown in FIG. 4, and S401 may be: reading and parsing information stored in the structure shown in FIG. 4 from the memory snapshot file.

In another implementation manner, the memory snapshot file provided in the embodiment of the present invention may also include two fields: a page type 51 and valid data 52 as shown in FIG. 5, and S401 may be reading and parsing information stored in the structure shown in FIG. 5 from the memory snapshot file.

Step S402: When a page type of a current $S^{th}$ memory page that is recorded in this memory snapshot file is an invalid data page, record the page type of the current $S^{th}$ memory page as an invalid data page in VMM memory space; and when the page type of the current $S^{th}$ memory page that is recorded in the memory snapshot file is a valid data page, record the page type of the current $S^{th}$ memory page as a valid data page in the VMM memory space, and correspondingly copy page data of the current $S^{th}$ memory page that is recorded in the memory snapshot file into an $S^{th}$ memory page of the virtual machine.

Specifically, in an implementation manner, the invalid data page includes a balloon page and a populate-on-demand page, and the valid data page includes a share page, a swap page, and a common page.

Correspondingly, step S402 may specifically include: when the page type of the current $S^{th}$ memory page that is recorded in the memory snapshot file is a balloon page, recording the page type of the current $S^{th}$ memory page as a balloon page in the VMM memory space; when the page type of the current $S^{th}$ memory page that is recorded in the memory snapshot file is a populate-on-demand page, recording the page type of the current $S^{th}$ memory page as a populate-on-demand page in the VMM memory space; when the page type of the current $S^{th}$ memory page that is recorded in the memory snapshot file is a share page, recording the page type of the current $S^{th}$ memory page as a share page in the VMM memory space, copying the page data of the current $S^{th}$ memory page that is recorded in the memory snapshot file into the $S^{th}$ memory page of the virtual machine, or copying the data into any memory page that shares data with the current $S^{th}$ memory page, and based on a page number recorded in the memory snapshot file, establishing, in the VMM memory space, a sharing relationship between the current $S^{th}$ memory page and a memory page corresponding to the foregoing page number; when the page type of the current $S^{th}$ memory page that is recorded in the memory snapshot file is a swap page, recording the page type of the current $S^{th}$ memory page as a swap page in the VMM memory space, and copying the page data of the current $S^{th}$ memory page that is recorded in the memory snapshot file into a new memory swap file, or recording the page type of the current $S^{th}$ memory page as a common page in the VMM memory space, and correspondingly copying the page data of the current $S^{th}$ memory page that is recorded in the memory snapshot file into the $S^{th}$ memory page of the virtual machine; and when the page type of the current $S^{th}$ memory page that is recorded in the memory snapshot file is a common page, recording the page type of the current $S^{th}$ memory page as a common page in the VMM memory space, and correspondingly copying the page data of the current $S^{th}$ memory page that is recorded in the memory snapshot file into the $S^{th}$ memory page of the virtual machine.

Alternatively, in another implementation manner, the invalid data page includes a balloon page, a populate-on-demand page, and a zero page, and the valid data page includes a non-zero page, a share page, and a swap page, and there may also exist the following two situations (for content same as the foregoing, details are not repeatedly described herein): when the page type of the current $S^{th}$ memory page that is recorded in the memory snapshot file is a zero page, recording the page type of the current $S^{th}$ memory page as a zero page in the VMM memory space, and setting content of the $S^{th}$ memory page of the virtual machine to 0; and when the page type of the current $S^{th}$ memory page that is recorded in the memory snapshot file is a non-zero page, recording the page type of the current $S^{th}$ memory page as a non-zero page in the VMM memory space, and correspondingly copying the page data of the current $S^{th}$ memory page that is recorded in the memory snapshot file into the $S^{th}$ memory page of the virtual machine.

To sum up, in the method for recovering a memory snapshot of a virtual machine provided by the embodiment of the present invention, a memory file of the virtual machine is obtained and parsed, and then, different snapshot recovery processing is performed according to different page types of memory pages that are recorded in a memory snapshot file, including: when a page type of a current $S^{th}$ memory page that is recorded in the memory snapshot file is an invalid data page, recording the page type of the current $S^{th}$ memory page as an invalid data page in VMM memory space; and when the page type of the current $S^{th}$ memory page that is recorded in the memory snapshot file is a valid data page, recording the page type of the current $S^{th}$ memory page as a valid data page in the VMM memory space, and correspondingly copying page data of the current $S^{th}$ memory page that is recorded in the memory snapshot file into an $S^{th}$ memory page of the virtual machine. Therefore, only valid data is recovered according to the embodiment of the present invention, thereby avoiding a recovery process of invalid data, and greatly shortening the recovery time of the memory snapshot.

Figure 7:
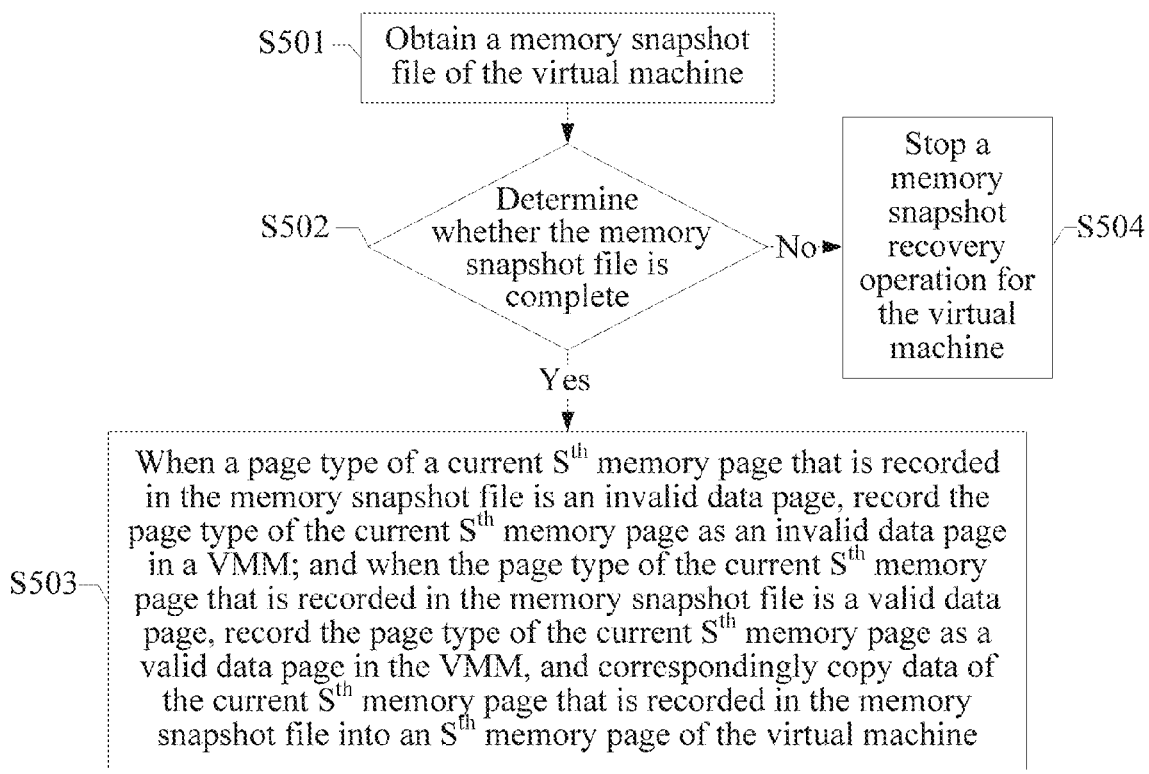
FIG. 7 is a schematic flowchart of another method for recovering a memory snapshot of a virtual machine according to an embodiment of the present invention.

FIG. 7 shows a method for recovering a memory snapshot of a virtual machine according to Embodiment 4 of the present invention. Step S501 and step S503 in this method are the same as step S401 and step S402 in Embodiments 3 and 4, respectively, and only step S502 of determining whether the memory snapshot file is complete; and if not, stopping a memory recovery operation; and if yes, performing step S503, that is, when the page type of the current $S^{th}$ memory page that is recorded in the memory snapshot file is an invalid data page, recording the page type of the current $S^{th}$ memory page as an invalid data page in the VMM memory space; and when the page type of the current $S^{th}$ memory page that is recorded in the memory snapshot file is a valid data page, recording the page type of the current $S^{th}$ memory page as a valid data page in the VMM memory space, and correspondingly copying the page data of the current $S^{th}$ memory page that is recorded in the memory snapshot file into the $S^{th}$ memory page of the virtual machine, is added after step S501.

Specifically, methods for determining whether the memory snapshot file is complete in step S502 mainly include:

Method 1: If global information of a memory of the virtual machine, including a memory size, the number of memory pages, and a memory page size, and so on of the virtual machine, is stored in the memory snapshot, for example, the structure of the memory snapshot file shown in FIG. 4 in Embodiment 2 of the present invention, the integrity of the memory snapshot is determined in this case by determining whether the number of memory pages in the memory snapshot is consistent with the number of memory pages stored in the global information; or a memory size may be calculated by using the number of memory pages and the memory page size (the memory size can be obtained by multiplying the number of memory pages by the memory page size), and then, it may be determined whether the calculated memory size is consistent with the memory size stored in the global information; or whether there exists content of a valid data segment to which a data offset points, that is, whether stored valid data is lost. If the number of memory pages is inconsistent, the memory sizes are inconsistent, or the content does not exist, it indicates that the memory snapshot is incomplete, and memory snapshot recovery is stopped S504.

Method 2: If the memory snapshot does not store global information of a memory of the virtual machine, for example, the structure of the memory snapshot file shown in FIG. 5 in Embodiment 2 of the present invention, the integrity of the memory snapshot determined in this case by determining, after a memory size is calculated, whether the calculated memory size is consistent with a memory size stored in a virtual machine configuration file. If they are inconsistent, it indicates that the memory snapshot is incomplete, and memory snapshot recovery is stopped.

It should be noted that, the foregoing two methods for determining the integrity of the memory snapshot are examples for description, and are not intended to limit the method to these two types. A basis for determining the integrity of the memory snapshot is whether memory information of the virtual machine stored in a snapshot is complete, and determination may be performed on all memory information, and as long as one piece of information is incomplete, memory recovery is stopped; or only the integrity of important information, for example, information that may cause an exception of the virtual machine after memory recovery, may be determined according to an actual situation. It is easy for a person skilled in the art to infer an equivalent determination manner or a combined equivalent determination manner for other information according to the embodiment of the present invention, which is not repeatedly described herein in the embodiment of the present invention.

If the integrity of the memory snapshot is not determined, in a current recovery mechanism of the memory snapshot of the virtual machine, the memory snapshot may be recovered; however, because of data loss, an exception may occur in the virtual machine after memory recovery.

To sum up, in the method for recovering a memory snapshot of a virtual machine provided by the embodiment of the present invention, a memory file of the virtual machine is obtained and parsed, and then, different snapshot recovery processing is performed according to different page types of memory pages that are recorded in a memory snapshot file, including: when a page type of a current $S^{th}$ memory page that is recorded in the memory snapshot file is an invalid data page, recording the page type of the current $S^{th}$ memory page as an invalid data page in VMM memory space; and when the page type of the current $S^{th}$ memory page that is recorded in the memory snapshot file is a valid data page, recording the page type of the current $S^{th}$ memory page as a valid data page in the VMM memory space, and correspondingly copying page data of the current $S^{th}$ memory page that is recorded in the memory snapshot file into an $S^{th}$ memory page of the virtual machine. Therefore, only valid data is recovered according to the embodiment of the present invention, thereby avoiding a recovery process of invalid data, and greatly shortening the recovery time of the memory snapshot.

Further, the integrity of the memory snapshot file is determined before the memory snapshot is recovered, thereby avoiding an unnecessary memory recovery operation, and improving the reliability of a memory snapshot recovery operation.

Figure 8:
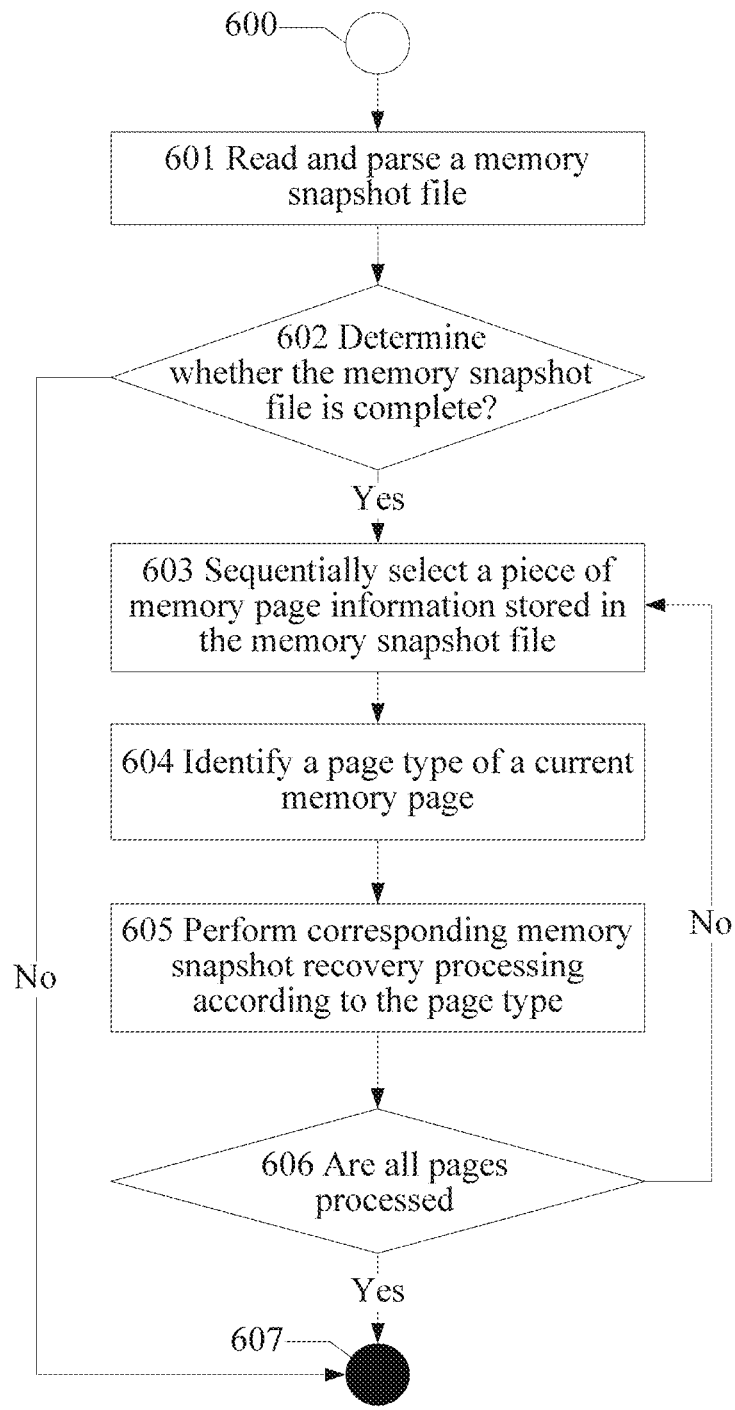
FIG. 8 is a schematic flowchart of still another method for recovering a memory snapshot of a virtual machine according to an embodiment of the present invention.

FIG. 8 is a specific flowchart of a method for recovering a memory snapshot of a virtual machine according to Embodiment 5 of the present invention. The method includes:

Step 600: The procedure starts.

Step 601: Read and parse a memory snapshot file.

Step 602: Determine whether the memory snapshot file is complete; and if the memory snapshot file is incomplete, go to step 607; and if the memory snapshot file is complete, go to step 603.

Step 603: Sequentially select a piece of memory page information stored in the memory snapshot file, where the memory page information includes a memory page type, valid data, a valid data offset, and so on (referring to the structure of the memory snapshot file shown in FIG. 4 or FIG. 5).

Step 604: Identify a page type of a current memory page according to the page type in the memory page information.

Step 605: Perform corresponding memory snapshot recovery processing according to the page type, which may specifically include: when the page type is a balloon page, recording the page type of the memory page as a balloon page in VMM memory space; when the page type is a populate-on-demand page, recording the page type of the memory page as a populate-on-demand page in the VMM memory space; when the page type is a zero page, recording the page type of the memory page as a zero page in the VMM memory space, and setting content of a corresponding memory page of the virtual machine to 0; when the page type is a non-zero page, recording the page type of the memory page as a non-zero page in the VMM memory space, and copying valid data of the memory into the corresponding memory page of the virtual machine according to valid data directly stored in the memory snapshot file or according to an address of valid data, where the address is obtained through calculation according to a data offset; when the page type is a share page, recording the page type of the memory page as a share page in the VMM memory space, copying the valid data of the memory into the corresponding memory page of the virtual machine according to the valid data directly stored in the memory snapshot file or according to the address of the valid data, where the address is obtained through calculation according to the data offset, and establishing, in a memory sharing hash table recorded in the VMM memory space, a sharing relationship between memory pages of various pieces of shared data; and when the page type is a swap page, recording the page type of the memory page as a swap page in the VMM memory space, and copying the valid data of the memory into a new swap file according to the valid data directly stored in the memory snapshot file or according to the address of the valid data, where the address is obtained through calculation according to the data offset; or recording the page type of the memory page as a zero page or a non-zero page in a page type structure stored in a VMM, and copying the valid data into the corresponding memory page of the virtual machine.

Optionally, the recording the type of the memory page in the VMM memory space in step 605 may be recovering a page type identifier of the memory page in a page type structure from which the memory page type is obtained when the memory snapshot is generated, or may be reestablishing a page type structure in the VMM memory space, and recording the type of the memory page therein, and in this case, an original page type structure is no longer used.

Step 606: Determine whether all pages are processed each time a memory snapshot recovery operation is finished, if yes, perform step 607, and if not, return to step 603 to continue the procedure.

Step 607: Stop a memory recovery operation.

It should be noted that, similar to the method for generating a memory snapshot provided by the embodiment of the present invention, the memory snapshot recovery process may be triggered by a user. A physical host provides a final user with a user interface to trigger a memory snapshot recovery operation; the memory snapshot operation may also be automatically triggered by the virtual machine, may be periodically triggered, or may be automatically triggered according to a running state or the like of the virtual machine.

It should be noted that, when the page type of the memory page is a swap page, according to a characteristic of the swap page, page data of the swap page can be copied into a memory swap file, where the memory swap file may be a new memory swap file rather than a memory swap file from which data is copied when the memory snapshot is generated; in this way, the swap page is still a swap page; alternatively, page data of the swap page may be copied into the corresponding memory page, and in this case, the swap page becomes a common page, and the page type of the swap page may be set to a zero page or a non-zero page according to whether data in the swap page is 0, and definitely, may also be set to a common page according to Embodiment 3 of the present invention.

In addition, it should be noted that, the memory snapshot file in Embodiments 3, 4, and 5 of the present invention may be the structure of the memory snapshot file in FIG. 4 or FIG. 5 in Embodiment 2 of the present invention or another structure obtained by means of equivalent replacement or obvious variation.

To sum up, in the method for recovering a memory snapshot of a virtual machine provided by the embodiment of the present invention, a memory file of the virtual machine is obtained and parsed, then, the integrity of the memory snapshot file is determined, and for the complete memory snapshot file, different snapshot recovery processing is performed according to a different page type of a memory page that is recorded in the memory snapshot file, including: when the page type of the memory page is a balloon page, recording the page type of the memory page as a balloon page in VMM memory space; when the page type of the memory page is a populate-on-demand page, recording the page type of the memory page as a populate-on-demand page in the VMM memory space; when the page type of the memory page is a zero page, recording the page type of the memory page as a zero page in the VMM memory space, and setting content of a corresponding memory page of the virtual machine to 0; when the page type of the memory page is a non-zero page, recording the page type of the memory page as a non-zero page in the VMM memory space, copying valid data of the memory into the corresponding memory page of the virtual machine according to valid data directly stored in the memory snapshot file or according to an address of valid data that is obtained through calculation according to a data offset; when the page type of the memory page is a share page, recording the page type of the memory page as a share page in the VMM memory space, copying the valid data of the memory into the corresponding memory page of the virtual machine according to the valid data directly stored in the memory snapshot file or according to the address of the valid data, where the address is obtained through calculation according to the data offset, and establishing, in a memory sharing hash table recorded in the VMM memory space, a sharing relationship between memory pages of various pieces of shared data; when the page type of the memory page is a swap page, recording the page type of the memory page as a swap page in the VMM memory space, copying the valid data of the memory into a new swap file according to the valid data directly stored in the memory snapshot file or according to the address of the valid data, where the address is obtained through calculation according to the data offset, or recording the page type of the memory page as a zero page or a non-zero page in a page type structure stored in a VMM, and copying the valid data into the corresponding memory page of the virtual machine. Therefore, only valid data is recovered according to the embodiment of the present invention, thereby avoiding a recovery process of invalid data, and greatly shortening the recovery time of the memory snapshot; moreover, the integrity of the memory snapshot file is determined before the memory snapshot is recovered, thereby avoiding an unnecessary memory recovery operation, and improving the reliability of a memory snapshot recovery operation.

Figure 9:
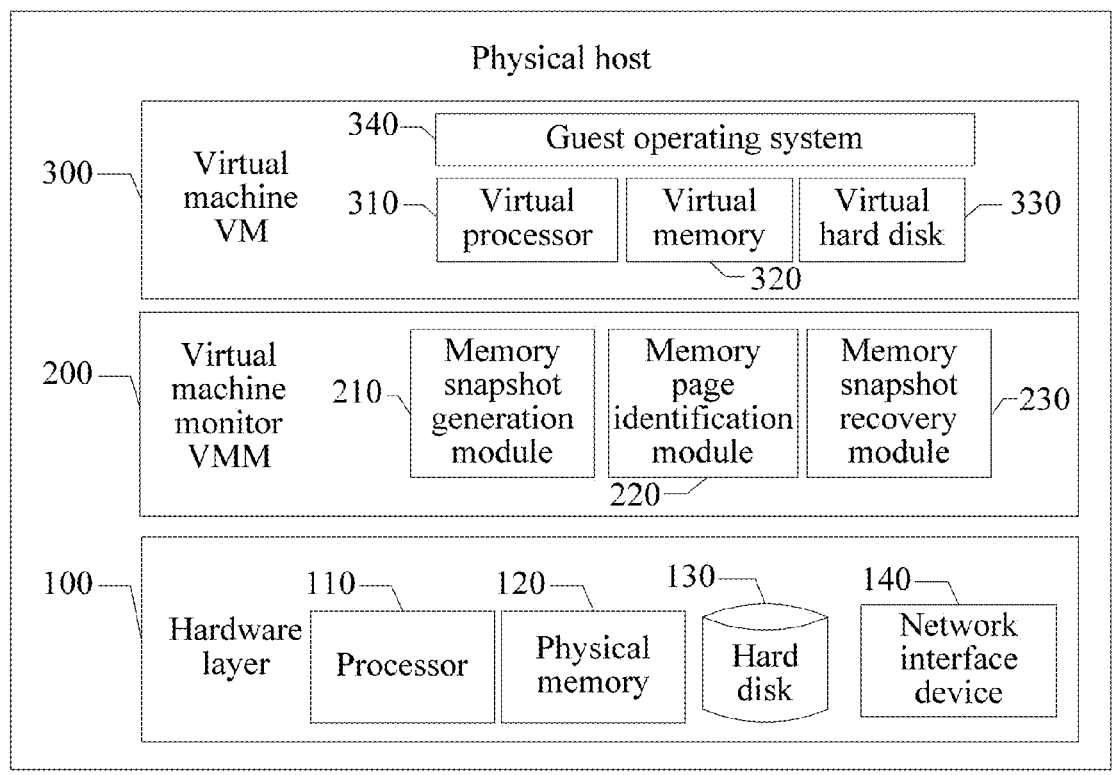
FIG. 9 is a schematic diagram of a logical structure of a physical host according to an embodiment of the present invention.

Embodiment 6 of the present invention further provides a physical host. Referring to FIG. 9, the physical host includes: a hardware layer 100, a virtual machine monitor VMM 200 running at the hardware layer 100, and a virtual machine 300 running on the virtual machine monitor VMM 200, where the virtual machine monitor VMM 200 includes a memory snapshot generation module 210 and a memory page identification module 220.

The memory snapshot generation module 210 is configured to obtain a current $S^{th}$ memory page of the virtual machine; when the memory page identification module 220 identifies that the current $S^{th}$ memory page is an invalid data page, record a page type of the current $S^{th}$ memory page in a memory snapshot file; and when the memory page identification module 220 identifies that the current $S^{th}$ memory page is a valid data page, record the page type and page data of the current $S^{th}$ memory page in the memory snapshot file.

It should be noted that, herein, the memory snapshot file may be stored in a storage device included by the hardware layer 100 of the physical host in the embodiment of the present invention; however, in Embodiment 6 of the present invention, it is not intended to limit that the memory snapshot file must be stored at the hardware layer 100 of the physical host. The memory snapshot file may be stored in the storage device at the hardware layer 100, for example, in a hard disk 130, or may be stored in a mobile storage device such as a universal serial bus (USB) flash drive or a mobile hard disk, or may be stored in an external network storage device having a communication connection to the physical host in the embodiment of the present invention.

The memory page identification module 220 is configured to identify the page type of the current $S^{th}$ memory page obtained by the memory snapshot generation module 210, where the page type includes an invalid data page and a valid data page.

Specifically, in an implementation manner, the memory page identification module 220 is specifically configured to identify the page type of the current $S^{th}$ memory page according to page type information stored in VMM memory space, where the page type includes a balloon page, a populate-on-demand page, a share page, a swap page, and a common page, where the balloon page and the populate-on-demand page are invalid data pages, and the share page, the swap page, and the common page are valid data pages.

Alternatively, in another implementation manner, the memory page identification module 210 is specifically configured to identify the page type of the current $S^{th}$ memory page according to page type information stored in VMM memory space, where the page type includes a balloon page, a populate-on-demand page, a share page, a swap page, and a common page; when the page type of the current $S^{th}$ memory page is a common page, traverse content of the current $S^{th}$ memory page, determine, according to a traversal result (the content of the memory page is all 0 or is not all 0), that the page type of the current $S^{th}$ memory page is a zero page or a non-zero page, where the balloon page, the populate-on-demand page, and the zero page are invalid data pages, and the non-zero page, the share page, and the swap page are valid data pages.

Further, in the physical host provided by the embodiment of the present invention, the hardware layer 100 includes a storage device, such as a hard disk 130, where the storage device is configured to store the memory snapshot file.

In addition, the composition of the hardware layer 100 is not limited in embodiment of the present invention, and the hardware layer 100 may include a storage device, such as the hard disk 130, or may not include the hard disk 130. In an exemplary implementation manner, the hardware layer 100 of the physical host may include a processor 110, a physical memory 120, the hard disk 130, and a network interface device 140, where one or more processors 110 may exist; and the network interface device 140 may be a network adapter or a network card and is configured to connect to any connectable network such as the Internet or an enterprise network. In another implementation manner, the hardware layer may not include the hard disk 130 (referring to the system embodiment). The virtual machine VM 300 may include a virtual processor 310, a virtual memory 320, a virtual hard disk 330, and a guest operating system 340, where a one-to-one mapping exists between logical memory pages of the virtual memory 320 and physical memory pages of the physical memory 120, and the memory snapshot to be generated in the embodiment of the present invention is a physical memory corresponding to the virtual memory; and the guest operating system (Guest OS) 340 is an operating system running on a virtual device such as the virtual processor 310, the virtual memory 320, or the virtual hard disk 330.

It should be noted that, it is not intended to limit that the virtual machine monitor VMM 200 shown in FIG. 9 runs at the hardware layer 100, and in practice, the virtual machine monitor VMM 200 may directly run at the hardware layer; the virtual machine monitor VMM 200 may also directly run on a host operating system (Host OS), and correspondingly, the host operating system may run at the hardware layer; in other words, the virtual machine monitor VMM 200 may indirectly run at the hardware layer.

It should be noted that, the physical host provided by the embodiment of the present invention may be a physical computer, and may be specifically a personal computer (PC), a laptop computer, a workstation, a server, a mainframe, a supercomputer, or the like.

In addition, Embodiment 7 of the present invention further provides a physical host. Referring to FIG. 9, besides the foregoing composition devices, the physical host may further include a memory snapshot recovery module 230 in the virtual machine monitor VMM 200.

The memory snapshot recovery module 230 is configured to obtain and parse a memory snapshot file of the virtual machine; when the page type of the current $S^{th}$ memory page that is recorded in the memory snapshot file is an invalid data page, record the page type of the current $S^{th}$ memory page as an invalid data page in the VMM memory space; and when the page type of the current $S^{th}$ memory page that is recorded in the memory snapshot file is a valid data page, record the page type of the current $S^{th}$ memory page as a valid data page in the VMM memory space, and correspondingly copy the page data of the current $S^{th}$ memory page that is recorded in the memory snapshot file into an $S^{th}$ memory page of the virtual machine.

Specifically, in an implementation manner, the invalid data page includes a balloon page and a populate-on-demand page, and the valid data page includes a share page, a swap page, and a common page.

Correspondingly, the memory snapshot recovery module 230 is specifically configured to: when the page type of the current $S^{th}$ memory page that is recorded in the memory snapshot file is a balloon page, record the page type of the current $S^{th}$ memory page as a balloon page in the VMM memory space; when the page type of the current $S^{th}$ memory page that is recorded in the memory snapshot file is a populate-on-demand page, record the page type of the current $S^{th}$ memory page as a populate-on-demand page in the VMM memory space; when the page type of the current $S^{th}$ memory page that is recorded in the memory snapshot file is a share page, record the page type of the current $S^{th}$ memory page as a share page in the VMM memory space, copy the page data of the current $S^{th}$ memory page that is recorded in the memory snapshot file into the $S^{th}$ memory page of the virtual machine, or copy the data into any memory page that shares data with the current $S^{th}$ memory page, and based on a page number recorded in the memory snapshot file, establish, in the VMM memory space, a sharing relationship between the current $S^{th}$ memory page and a memory page corresponding to the foregoing page number; when the page type of the current $S^{th}$ memory page that is recorded in the memory snapshot file is a swap page, record the page type of the current $S^{th}$ memory page as a swap page in the VMM memory space, and copy the page data of the current $S^{th}$ memory page that is recorded in the memory snapshot file into a new memory swap file, or record the page type of the current $S^{th}$ memory page as a common page in the VMM memory space, and correspondingly copy the page data of the current $S^{th}$ memory page that is recorded in the memory snapshot file into the $S^{th}$ memory page of the virtual machine; and when the page type of the current $S^{th}$ memory page that is recorded in the memory snapshot file is a common page, record the page type of the current $S^{th}$ memory page as a common page in the VMM memory space, and correspondingly copy the page data of the current $S^{th}$ memory page that is recorded in the memory snapshot file into the $S^{th}$ memory page of the virtual machine.

Alternatively, in another implementation manner, the invalid data page includes a balloon page, a populate-on-demand page, and a zero page, and the valid data page includes a non-zero page, a share page, and swap page.

Correspondingly, the memory snapshot recovery module 230 is specifically configured to: when the page type of the current $S^{th}$ memory page that is recorded in the memory snapshot file is a balloon page, record the page type of the current $S^{th}$ memory page as a balloon page in the VMM memory space; when the page type of the current $S^{th}$ memory page that is recorded in the memory snapshot file is a populate-on-demand page, record the page type of the current $S^{th}$ memory page as a populate-on-demand page in the VMM memory space; when the page type of the current $S^{th}$ memory page that is recorded in the memory snapshot file is a share page, record the page type of the current $S^{th}$ memory page as a share page in the VMM memory space, copy the page data of the current $S^{th}$ memory page that is recorded in the memory snapshot file into the $S^{th}$ memory page of the virtual machine, or copy the data into any memory page that shares data with the current $S^{th}$ memory page, and based on a page number recorded in the memory snapshot file, establish, in the VMM memory space, a sharing relationship between the current $S^{th}$ memory page and a memory page corresponding to the foregoing page number; when the page type of the current $S^{th}$ memory page that is recorded in the memory snapshot file is a swap page, record the page type of the current $S^{th}$ memory page as a swap page in the VMM memory space, and copy the page data of the current $S^{th}$ memory page that is recorded in the memory snapshot file into a new memory swap file, or record the page type of the current $S^{th}$ memory page as a common page in the VMM memory space, and correspondingly copy the page data of the current $S^{th}$ memory page that is recorded in the memory snapshot file into the $S^{th}$ memory page of the virtual machine; when the page type of the current $S^{th}$ memory page that is recorded in the memory snapshot file is a zero page, record the page type of the current $S^{th}$ memory page as a zero page in the VMM memory space, and set content of the $S^{th}$ memory page of the virtual machine to 0; and when the page type of the current $S^{th}$ memory page that is recorded in the memory snapshot file is a non-zero page, record the page type of the current $S^{th}$ memory page as a non-zero page in the VMM memory space, and correspondingly copy the page data of the current $S^{th}$ memory page that is recorded in the memory snapshot file into the $S^{th}$ memory page of the virtual machine.

To sum up, in the physical host provided by the embodiment of the present invention, a memory snapshot generation module obtains a current $S^{th}$ memory page of a virtual machine, and then, a memory page identification module identifies a page type of the current $S^{th}$ memory page, when the current $S^{th}$ memory page is identified as an invalid data page, the page type of the current $S^{th}$ memory page is recorded in a memory snapshot file, and when the current $S^{th}$ memory page is identified as a valid data page, the page type and page data of the current $S^{th}$ memory page are recorded in the memory snapshot file. Therefore, according to the embodiment of the present invention, only valid data is stored, thereby avoiding backup of invalid data, greatly shortening the generation time of a memory snapshot, and reducing storage resources occupied by the memory snapshot.

Further, a memory snapshot recovery module obtains and parses the memory snapshot file of the virtual machine; when the page type of the current $S^{th}$ memory page that is recorded in the memory snapshot file is an invalid data page, the page type of the current $S^{th}$ memory page is recorded as an invalid data page in VMM memory space; and when the page type of the current $S^{th}$ memory page that is recorded in the memory snapshot file is a valid data page, the page type of the current $S^{th}$ memory page is recorded as a valid data page in the VMM memory space, and the page data of the current $S^{th}$ memory page that is recorded in the memory snapshot file is correspondingly copied into an $S^{th}$ memory page of the virtual machine. Therefore, only valid data is recovered according to the embodiment of the present invention, thereby avoiding a recovery process of invalid data, and greatly shortening the recovery time of the memory snapshot.

Figure 10:
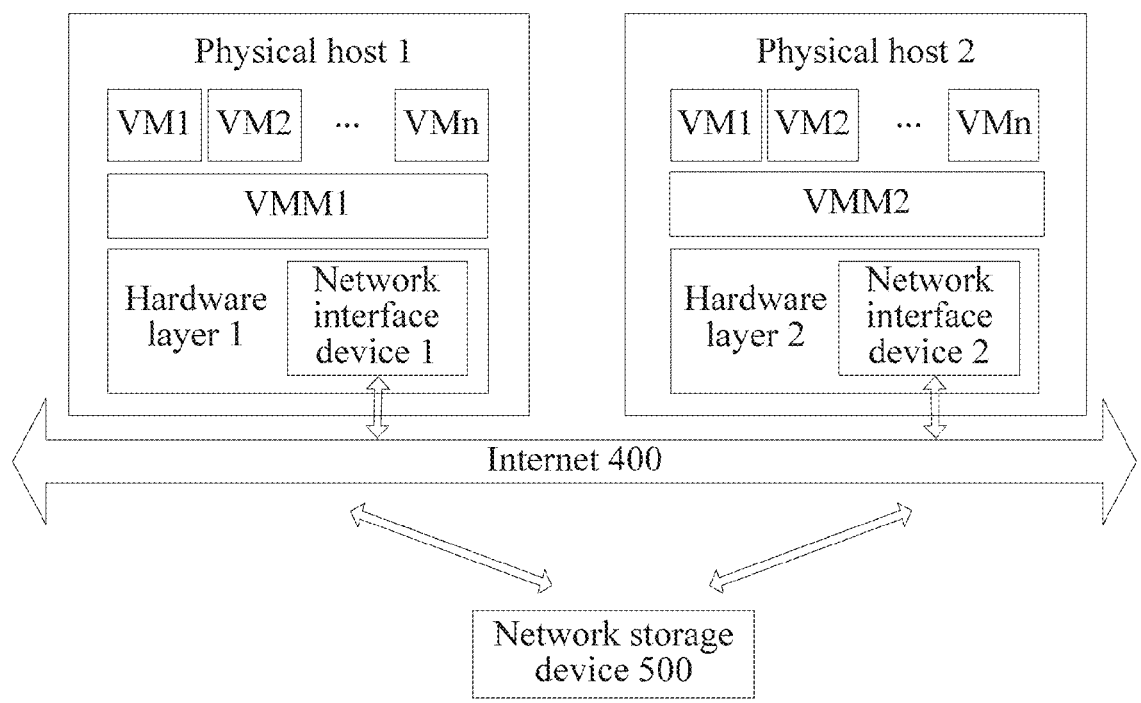
FIG. 10 is a schematic diagram of a logical structure of a computer system according to an embodiment of the present invention.

FIG. 10 is a logical structural diagram of a computer system according to Embodiment 8 of the present invention. The system includes: a physical host 1, a physical host 2, and one network storage device 500, where the physical host 1 and the physical host 2 are the physical host in Embodiment 6 or 7 of the present invention, and include a hardware layer, a VMM, and virtual machine 1 (VM1) to virtual machine n (VMn), where n is greater than or equal to 1; in other words, one or more virtual machines may be hosted on the VMM; and the network storage device 500 is configured to store a memory snapshot file of a virtual machine hosted on the physical host 1 or the physical host 2.

The physical host 1 and the physical host 2 are connected to the Internet 400 though a network interface device 1 and a network interface device 2, respectively, and then, the memory snapshot file of the virtual machine can be stored into the network storage device 500 through the Internet 400.

It should be noted that, the memory snapshot file in the system provided in the embodiment of the present invention may be stored in the network storage device only, or may be stored in both the network storage device and a storage device on a hardware layer of the physical host, which is not limited.

Figure 11:
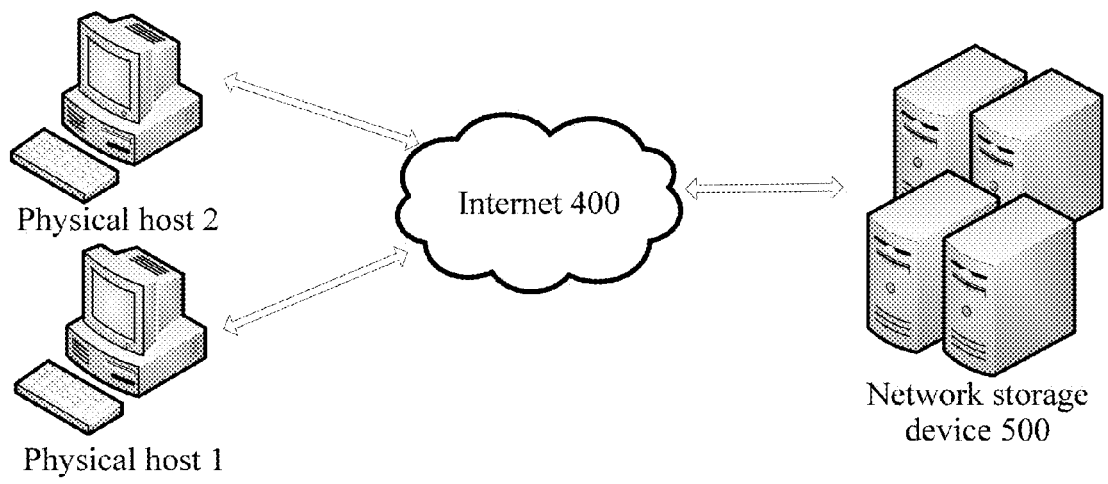
FIG. 11 is a schematic diagram of physical deployment of a computer system according to an embodiment of the present invention.

FIG. 11 is a network topology diagram of a computer system according to Embodiment 9 of the present invention, where a physical host 1 and a physical host 2 are connected to a network storage device 500 through the Internet 400.

Optionally, the network storage device may adopt a centralized storage mode or may adopt a distributed storage mode. One network storage device may exist and adopt a centralized storage mode, or multiple network storage devices may exist and adopt a single storage mode or a distributed storage mode. The centralized storage mode refers to storing one memory snapshot file into one network storage device, and the distributed storage mode refers to storing one memory snapshot file into multiple network storage devices. The latter is more applicable to a situation where there are many physical hosts and a lot of memory snapshot files are generated.

To sum up, in the system for generating and recovering a memory snapshot of a virtual machine provided by the embodiments of the present invention, different memory page types are identified, and different snapshot generation processing is performed according to the different memory page types in a memory snapshot generation process, including: when a current $S^{th}$ memory page is an invalid data page, only recording a page type of the current $S^{th}$ memory page in a memory snapshot file; and when the current $S^{th}$ memory page is a valid data page, recording the page type and page data of the current $S^{th}$ memory page in the memory snapshot file; and different snapshot recovery processing is performed according to the different memory page types in a memory snapshot recovery process, including: when the page type of the current $S^{th}$ memory page that is recorded in the memory snapshot file is an invalid data page, recording the page type of the current $S^{th}$ memory page as an invalid data page in VMM memory space; and when the page type of the current $S^{th}$ memory page that is recorded in the memory snapshot file is a valid data page, recording the page type of the current $S^{th}$ memory page as a valid data page in the VMM memory space, and correspondingly copying the page data of the current $S^{th}$ memory page that is recorded in the memory snapshot file into an $S^{th}$ memory page of the virtual machine. Therefore, according to the embodiment of the present invention, only valid data is stored, thereby reducing backup and recovery of invalid data, greatly shortening the generation and recovery time of the memory snapshot, and reducing storage resources occupied by the memory snapshot.

In a specific example, for a typical Windows virtual machine in a desktop cloud environment, the virtual machine has 4G memory in total, and in a common service scenario, zero pages occupy up to about 50% of the total memory of the virtual machine on average, and balloon pages also account for 10% of the total memory of the virtual machine. At this time, if the technologies for generating and recovering a memory snapshot that are provided by the embodiments of the present invention are applied, the generation and recovery time of the memory snapshot is shortened to about 40% of that in the implementation manner in the prior art, and at the same time, the size of the memory snapshot file is reduced to 1.61G from original 4G (other data in the memory snapshot file, except memory page data, occupies about 10M).

Further, the memory snapshot file is stored by the network storage device provided by the embodiment of the present invention, thereby avoiding a problem that local access space is insufficient when there is a large quantity of memory snapshot files, and if the distributed network storage mode is adopted simultaneously, the access bottleneck problem of the centralized storage mode is also solved.

A person of ordinary skill in the art may understand that all or a part of the processes of the methods in the embodiments may be implemented by a computer program instructing relevant hardware (such as a processor). The program may be stored in a computer readable storage medium. When the program runs, the processes of the methods in the embodiments are performed. The storage medium may be a magnetic disk, an optical disc, a Read-Only Memory (ROM), a Random Access Memory (RAM), or the like.

It should be noted that, the foregoing descriptions are merely specific implementation manners of the present invention, and a person of ordinary skill in the art may make various improvements and refinements without departing from the principle of the present invention. All such modifications and refinements shall also be construed as falling within the protection scope of the present invention.

What is claimed is:

1. A method for generating a memory snapshot of a virtual machine, comprising:
   obtaining a current $S^{th}$ memory page of the virtual machine;
   identifying a page type of the current $S^{th}$ memory page, wherein the page type comprises an invalid data page and a valid data page;
   recording the page type of the current $S^{th}$ memory page in a memory snapshot file when the current $S^{th}$ memory page is the invalid data page; and
   recording the page type and page data of the current $S^{th}$ memory page in the memory snapshot file when the current $S^{th}$ memory page is the valid data page,
   wherein identifying the page type of the current $S^{th}$ memory page specifically comprises determining the page type of the current $S^{th}$ memory page according to page type information stored in virtual machine monitor (VMM) memory space,
   wherein the page type comprises a balloon page, a populate-on-demand page, a share page, a swap page, and a common page,
   wherein the balloon page and the populate-on-demand page are invalid data pages,
   wherein the share page, the swap page, and the common page are valid data pages,
   wherein recording the page type of the current $S^{th}$ memory page in the memory snapshot file when the current $S^{th}$ memory page is the invalid data page, and recording the page type and the page data of the current $S^{th}$ memory page in the memory snapshot file when the current $S^{th}$ memory page is the valid data page specifically comprises:
      recording the page type of the current $S^{th}$ memory page as the balloon page in the memory snapshot file when the current $S^{th}$ memory page is the balloon page;
      recording the page type of the current $S^{th}$ memory page as the populate-on-demand page in the memory snapshot file when the current $S^{th}$ memory page is the populate-on-demand page;
      recording the page type of the current $S^{th}$ memory page as the swap page in the memory snapshot file;
      copying page data of the swap page from a memory swap file into the memory snapshot file when the current $S^{th}$ memory page is the swap page;
      recording the page type of the current $S^{th}$ memory page as the share page in the memory snapshot file;
      copying the page data of the share page into the memory snapshot, file;
      recording a page number of another memory page sharing memory data with the current $S^{th}$ memory page when the current $S^{th}$ memory page is the share page;
      recording the page type of the current $S^{th}$ memory page as the common page in the memory snapshot file; and
      copying page data of the common page into the memory snapshot file when the current $S^{th}$ memory page is the common page.

2. A method for generating a memory snapshot of a virtual machine, comprising:
   obtaining a current $S^{th}$ memory page of the virtual machine;
   identifying a page type of the current $S^{th}$ memory page, wherein the page type comprises an invalid data page and a valid data page;
   recording the page type of the current $S^{th}$ memory page in a memory snapshot file when the current $S^{th}$ memory page is the invalid data page; and
   recording the page type and page data of the current $S^{th}$ memory page in the memory snapshot file when the current $S^{th}$ memory page is the valid data page,
   wherein identifying the page type of the current $S^{th}$ memory page specifically comprises:
      determining the page type of the current $S^{th}$ memory page according to page type information stored in virtual machine monitor (VMM) memory space, wherein the page type comprises a balloon page, a populate-on-demand page, a share page, a swap page, and a common page; and
      traversing content of the current $S^{th}$ memory page, and determining, according to a traversal result, that the page type of the current $S^{th}$ memory page is a zero page or a non-zero page when the page type of the current $S^{th}$ memory page is the common page, wherein the balloon page, the populate-on-demand page, and the zero page are invalid data pages, and wherein the non-zero page, the share page, and the swap page are valid data pages, and
   wherein recording the page type of the current $S^{th}$ memory page in the memory snapshot file when the current $S^{th}$ memory page is the invalid data page, and recording the page type and the page data of the current $S^{th}$ memory page in the memory snapshot file when the current $S^{th}$ memory page is the valid data page specifically comprises:
      recording the page type of the current $S^{th}$ memory page as the balloon page in the memory snapshot file when the current $S^{th}$ memory page is the balloon page;
      recording the page type of the current $S^{th}$ memory page as the populate-on-demand page in the memory snapshot file when the current $S^{th}$ memory page is the populate-on-demand page;
      recording the page type of the current $S^{th}$ memory page as the zero page in the memory snapshot file when the current $S^{th}$ memory page is the zero page;
      recording the page type of the current $S^{th}$ memory page as the non-zero page in the memory snapshot file;
      copying the page data of the current $S^{th}$ memory page into the memory snapshot file when the current $S^{th}$ memory page is the non-zero page;
      recording the page type of the current $S^{th}$ memory page as the swap page in the memory snapshot file;
      copying the page data of the swap page from a memory swap file into the memory snapshot file when the current $S^{th}$ memory page is the swap page;
      recording the page type of the current $S^{th}$ memory page as the share page in the memory snapshot file;
      copying page data of the share page into the memory snapshot file; and
      recording a page number of another memory page sharing memory data with the current $S^{th}$ memory page when the current $S^{th}$ memory page is the share page.

3. A method for recovering a memory snapshot of a virtual machine, comprising:

obtaining and parsing a memory snapshot file of the virtual machine;

recording a page type of a current $S^{th}$ memory page as an invalid data page in virtual machine monitor (VMM) memory space when the page type of the current $S^{th}$ memory page that is recorded in the memory snapshot file is the invalid data page; and recording the page type of the current $S^{th}$ memory page as a valid data page in the VMM memory space, and correspondingly copying page data of the current $S^{th}$ memory page that is recorded in the memory snapshot file into an $S^{th}$ memory page of the virtual machine when the page type of the current $S^{th}$ memory page that is recorded in the memory snapshot file is the valid data page, wherein the invalid data page comprises a balloon page and a populate-on-demand page, wherein the valid data page comprises a share page, a swap page, and a common page, and wherein recording the page type of the current $S^{th}$ memory page as the invalid data page in VMM memory space when the page type of the current $S^{th}$ memory page that is recorded in the memory snapshot file is the invalid data page, and recording the page type of the current $S^{th}$ memory page as the valid data page in the VMM memory space, and correspondingly copying the page data of the current $S^{th}$ memory page that is recorded in the memory snapshot file into an $S^{th}$ memory page of the virtual machine when the page type of the current $S^{th}$ memory page that is recorded in the memory snapshot file is the valid data page specifically comprises:

recording the page type of the current $S^{th}$ memory page as the balloon page in the VMM memory space when the page type of the current $S^{th}$ memory page that is recorded in the memory snapshot tile is the balloon page;

recording the page type of the current $S^{th}$ memory page as the populate-on-demand page in the, VMM memory space when the page type of the current $S^{th}$ memory page that is recorded in the memory snapshot file is the populate-on-demand page;

recording the page type of the current $S^{th}$ memory page as the share page in the VMM memory space;

either copying the page data of the current $S^{th}$ memory page that is recorded in the memory snapshot file into the $S^{th}$ memory page of the virtual machine, or copying the data into any memory page that shares data with the current $S^{th}$ memory page;

establishing, in the VMM memory space and based on a page number recorded in the memory snapshot file, a sharing relationship between the current $S^{th}$ memory page and a memory page corresponding to the page number when the page type of the current $S^{th}$ memory page that is recorded in the memory snapshot file is the share page;

recording the page type of the current $S^{th}$ memory page as the swap page in the VMM memory space;

either copying the page data of the current $S^{th}$ memory page that is recorded in the memory snapshot file into a new memory swap file, or recording the page type of the current $S^{th}$ memory page as a common page in the VMM memory space;

copying the page data of the current $S^{th}$ memory page that is recorded in the memory snapshot file into the $S^{th}$ memory page of the virtual machine when the page type of the current $S^{th}$ memory page that is recorded in the memory snapshot file is the swap page;

recording the page type of the current $S^{th}$ memory page as the common page in the, VMM memory space; and copying the page data of the current $S^{th}$ memory page that is recorded in the memory snapshot file into the $S^{th}$ memory page of the virtual machine when the page type of the current $S^{th}$ memory page that is recorded in the memory snapshot file is the common page.

4. A method for recovering a memory snapshot of a virtual machine, comprising:

obtaining and parsing a memory snapshot file of the virtual machine;

recording a page type of a current $S^{th}$ memory page as an invalid data page in virtual machine monitor (VMM) memory space when the page type of the current $S^{th}$ memory page that is recorded in the memory snapshot file is the invalid data page; and recording the page type of the current $S^{th}$ memory page as a valid data page in the VMM memory space, and correspondingly copying page data of the current $S^{th}$ memory page that is recorded in the memory snapshot file into an $S^{th}$ memory page of the virtual machine when the page type of the current $S^{th}$ memory page that is recorded in the memory snapshot file is the valid data page, wherein the invalid data page comprises a balloon page, a populate-on-demand page, and a zero page, wherein the valid data page comprises a non-zero page, a share page, and a swap page, and wherein recording the page type of the current $S^{th}$ memory page as the invalid data page in VMM memory space when the page type of the current $S^{th}$ memory page that is recorded in the memory snapshot file is the invalid data page, and recording the page type of the current $S^{th}$ memory page as the valid data page in the VMM memory space, and correspondingly copying page data of the current $S^{th}$ memory page that is recorded in the memory snapshot file into the $S^{th}$ memory page of the virtual machine when the page type of the current $S^{th}$ memory page that is recorded in the memory snapshot file is the valid data page specifically comprises:

recording the page type of the current $S^{th}$ memory page as the balloon page in the VMM memory space when the page type of the current $S^{th}$ memory page that is recorded in the memory snapshot file is the balloon page;

recording the page type of the current $S^{th}$ memory page as the populate-on-demand page in the VMM memory space when the page type of the current $S^{th}$ memory page that is recorded in the memory snapshot file is the populate-on-demand page;

recording the page type of the current $S^{th}$ memory page as the zero page in the VMM memory space;

setting content of the $S^{th}$ memory page of the virtual machine to zero when the page type of the current $S^{th}$ memory page that is recorded in the memory snapshot file is the zero page;

recording the page type of the current $S^{th}$ memory page as the non-zero page in the VMM memory space;

copying the page data of the current $S^{th}$ memory page that is recorded in the memory snapshot file into the $S^{th}$ memory page of the virtual machine when the page type of the current $S^{th}$ memory page that is recorded in the memory snapshot file is the non-zero page;
recording the page type of the current $S^{th}$ memory page as the share page in the VMM memory space;
either copying the page data of the current $S^{th}$ memory page that is recorded in the memory snapshot file into the $S^{th}$ memory page of the virtual machine, or copying the data into any memory page that shares data with the current $S^{th}$ memory page;
establishing, in the VMM memory space and based on the page number recorded in the memory snapshot file, a sharing relationship between the current $S^{th}$ memory page and a memory page corresponding to the page number when the page type of the current $S^{th}$ memory page that is recorded in the memory snapshot file is the share page;
recording the page type of the current $S^{th}$ memory page as a swap page in the VMM memory space;
either copying the page data of the current $S^{th}$ memory page that is recorded in the memory snapshot file into a memory swap file, or recording the page type of the current $S^{th}$ memory page as the zero page or the non-zero page in the VMM memory space; and
copying the page data of the current $S^{th}$ memory page that is recorded in the memory snapshot file into the $S^{th}$ memory page of the virtual machine when the page type of the current $S^{th}$ memory page that is recorded in the memory snapshot file is the swap page.

* * * * *